May 14, 1968 P. M. ARNOLD 3,383,261
METHOD AND APPARATUS FOR FORMING A BIAXIALLY
ORIENTED PLASTIC FILM LAMINATE
Filed March 8, 1965 3 Sheets-Sheet 1
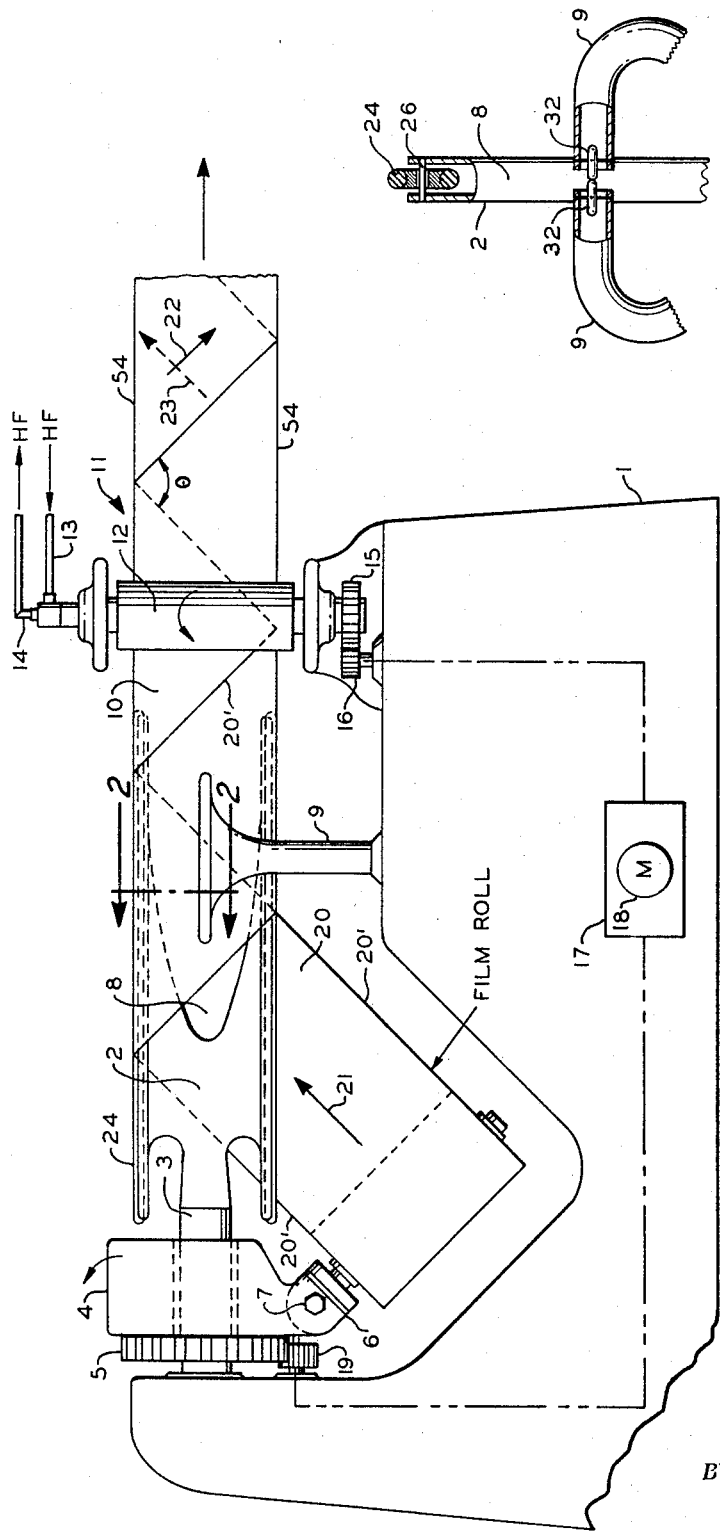
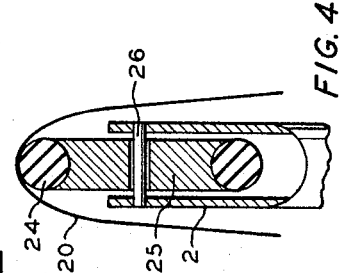
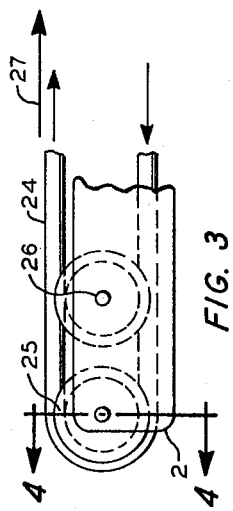
INVENTOR
P.M. ARNOLD
BY *Young & Quigg*
ATTORNEYS May 14, 1968  P. M. ARNOLD  3,383,261
METHOD AND APPARATUS FOR FORMING A BIAXIALLY
ORIENTED PLASTIC FILM LAMINATE
Filed March 8, 1965  3 Sheets-Sheet 2

INVENTOR
P. M. ARNOLD
BY
Young & Quigg
ATTORNEYS

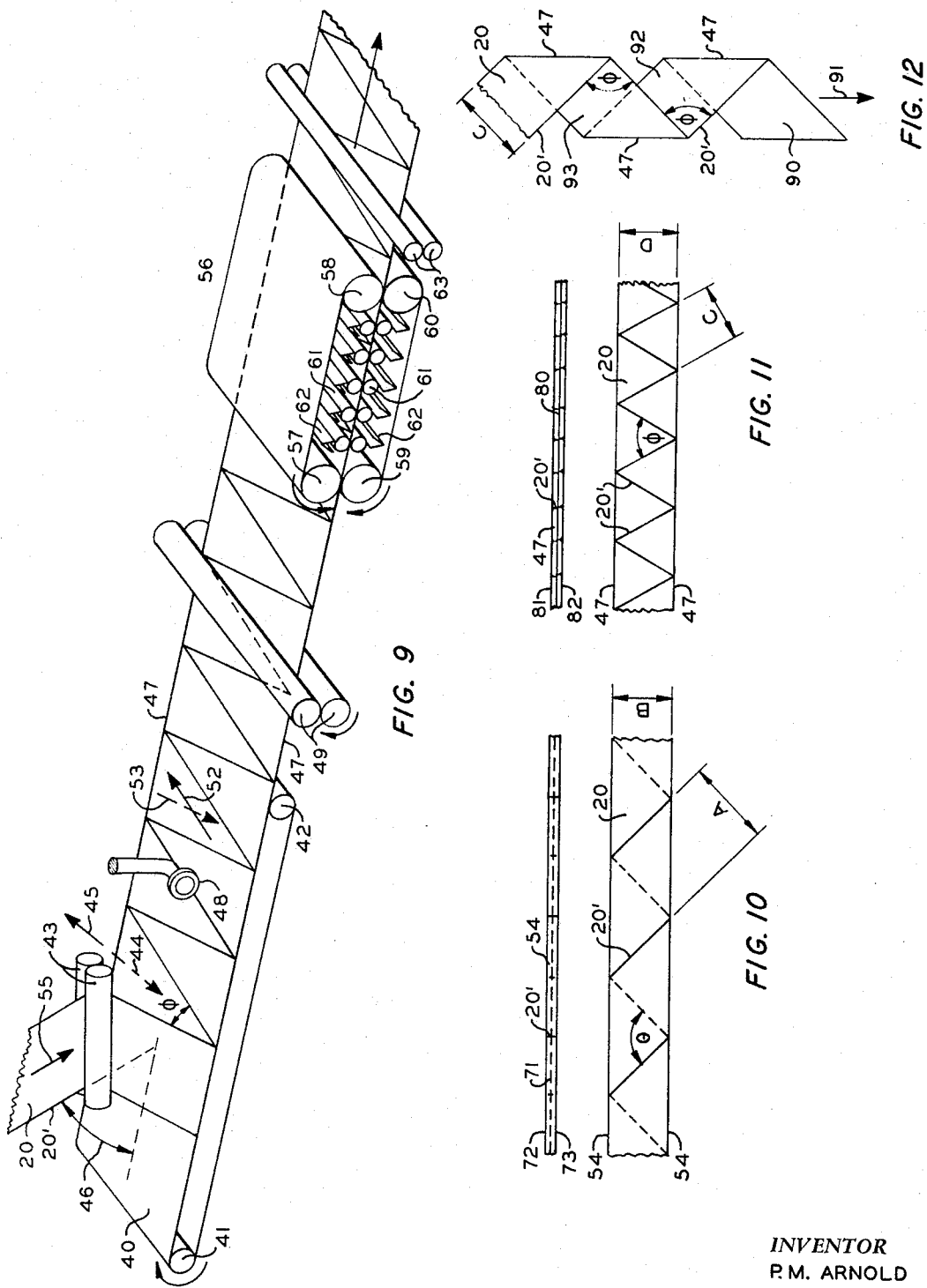

3,383,261
METHOD AND APPARATUS FOR FORMING A BIAXIALLY ORIENTED PLASTIC FILM LAMINATE
Philip M. Arnold, Bartlesville, Okla., assignor to Phillips Petroleum Company, a corporation of Delaware
Filed Mar. 8, 1965, Ser. No. 437,767
6 Claims. (Cl. 156—189)

ABSTRACT OF THE DISCLOSURE

Method and apparatus for producing biaxially oriented plastic film laminates by which a uniaxially oriented plastic film is spirally wrapped about a stationary mandrel of rectangular cross-section to form a tube of the plastic. The tube is first flattened in the center to abut the opposite walls and subsequently the remainder of the tube is flattened and bonded to form a laminated sheet having biaxial orientation.

---

This invention relates to a method and apparatus for producing laminated film and the laminated product thereof.

It is known to stretch a film of plastic material in a specific direction, e.g., transverse to the longitudinal axis of the film, in order to strengthen same in that direction and produce a uniaxially oriented film. However, it is much more desirable to have a film that is strengthened in two directions so that the overall strength increase is more uniform. A single film is difficult to orient in more than one direction without tearing the film and even when this biaxial orientation is achieved the overall total strength increase is less than that desired. Thus, in order to achieve biaxially oriented films of desirable overall strength values it was conceived to form laminates of two separate films each oriented in a different direction so that when these two separate films were joined there was formed a laminate in which one layer was uniaxially oriented in a direction opposite to the orientation of the second layer.

It has now been found that a major weakness in the above two-film laminate resides in the exposed, outer, longitudinal edges of the laminate where the zone of adhesion between the two separate films is exposed. It was found that the resistance of these two-film laminates to delamination (layer separation) was lower than necessary because of this adhesion zone being exposed to both envinronmental and mechanical wear. Also this type of laminate is more vulnerable to incipient delamination caused by faulty fabrication methods such as trimming, winding, and the like. Further, it was found that once incipient separation of the two films at the exposed adhesion zone is effected further separation followed readily.

In view of the above finding it was further found that a biaxially oriented plastic film laminate which is at least as strong as two-film laminates can be made from a single, at least uniaxially oriented plastic film and that the resulting laminate has substantially greater delamination resistance than the two-film laminates because it possesses outer longitudinal edges which were formed by folding the film itself in order to form upper and lower layers thereby eliminating exposed, outer, longitudinal edges. It was found that not only is the laminate of this invention manyfold stronger and more resistant to delamination but also, because of the smooth, integral or closed edges produced, the laminate product of this invention required no edge trimming as did the two-film laminate discussed above. The elimination of the trimming process saves not only in cost but also in delamination problems, since trimming is a major factor contributing to the separation of layers of a two-film laminate.

Thus, according to this invention a biaxially oriented plastic film laminate is provided from a single, at least uniaxially oriented, plastic film by forming a strip of the film into a spirally or helically wound tube, flattening the tube, and causing the opposite sides or laminae of the flattened tube to adhere to each other, as by heat or by the application of an adhesive, for example. The biaxially oriented laminate can be produced from a single uniaxially oriented film by helically disposing or winding the film so that opposite sides thereof are contiguous or by transversely disposing (e.g., folding) the film relative to its longitudinal axis in a zigzag fashion so that the same sides of the film are contiguous.

It was further found that in making the above helically disposed single-film laminate if the film was first rolled onto a round mandrel and then flattened, difficulty is encountered in withdrawing the film from the round mandrel without damaging the film or separating the edges of the wrapped film from each other.

It was then found that the biaxial laminate having two integrally connected longitudinal edges could be made from a single uniaxial film and readily removed as such by helically winding the film about a mandrel which has a configuration such that, due to the winding there is formed a hollow, integral, continuous tube of film having a transverse cross-section in which the major axis is substantially, i.e. at least four times, longer than the minor axis and then forcing the opposite walls of the tube together only along the center line thereof. After this initial forcing step, substantially all of the remaining areas of the walls already in a contiguous relationship as to their center portions could be forced into a contiguous relationship and bonded without cracking at the integral edges. There is thus formed a single plastic film laminate having biaxial orientation and two substantially crack-free, integrally connected longitudinal edges.

The apparatus for carrying out the above method of helical formation of the laminate is achieved by the use of a flat mandrel, preferably stationary, around which the single film is rotated. The mandrel itself has a transverse cross section in which one of the two major axes is susbtantially longer, preferably at least four times longer, than the other major axis in the cross section. Thus, wrapping of the mandrel by the single film produces a tubular article having two sides perpendicular to the shorter major axis of the mandrel. These sides are then forced together first at their central portions parallel to the shorter major axis of the mandrel and then at the remaining portions of the two sides so that bonding can be effected and a single laminate produced with substantially crack-free, integrally connected, longitudinal edges. The shorter major axis of the mandrel is parallel to the minor axis of the film tube before flattening of same while the longer major axis of the mandrel is parallel to the major axis of the film tube before flattening of same.

Further, a biaxially oriented plastic film laminate having two integrally connected longitudinal edges, i.e. internally nonexposed edges, and having a zigzag and flattened configuration as above described can be made by orienting the film above a support in a manner such that the film approaches the support from above same at an angle of less than 90° between the longitudinal axis of the film and support, said angle being in a direction away from the direction in which the laminate leaves the support and so that the longer major axis of the transverse cross section of the film is in substantially the same vertical plane as the longitudinal axis of the support. With such an orientation the film can then be cross laid on the support by moving the film or support or both away from one another along the longitudinal axis of the support and reciprocally moving the longitudinal axis of the film transversely to the longitudinal axis of the support. These movements are coordinated so that the film is laid in successive transverse layers onto the support in a manner such that each layer partially extends over a prior layer and partially over an uncovered portion of the support. The zigzag laminate so formed then has each cross layer bonded to other cross layers to which it is contiguous and the resulting product is a single plastic film laminate having biaxial orientation and two integrally connected longitudinal edges.

Accordingly, it is an object of this invention to provide a new and improved film laminate. It is another object of this invention to provide a new and improved method for making a film laminate. It is another object of this invention to provide a new and improved apparatus for making a film laminate.

Other aspects, objects and the several advantages of the invention will be apparent to those skilled in the art from the description and the appended claims.

FIGURE 1 is an elevation view of apparatus employing the concepts of this invention.

FIGURE 2 is a detailed sectional view of a part of the apparatus of FIGURE 1.

FIGURE 3 is a detailed view of a part of the apparatus of FIGURE 1.

FIGURE 4 is a detailed sectional view of the apparatus of FIGURE 3.

FIGURE 9 is an axonometric view of the apparatus employing the concepts of this invention.

FIGURE 10 is a plan and edge view of the product of the apparatus of FIGURE 1.

FIGURE 11 is a plan and edge view of the product of the apparatus of FIGURE 9.

FIGURE 12 is an edge view of the product of the apparatus of FIGURE 9 in a partially unfolded disposition.

Figure 5:
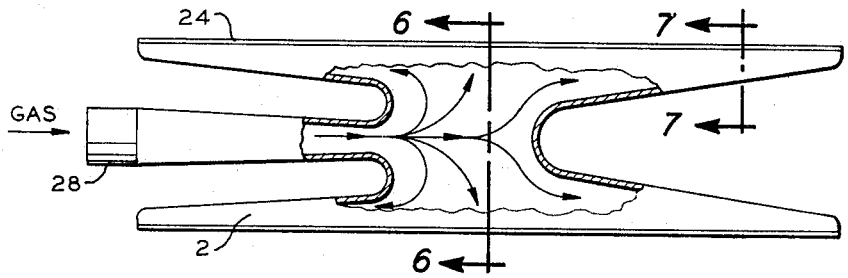
FIGURE 5 is a side view of a mandrel employing the concepts of this invention.

In FIGURE 1, frame 1 supports fixed mandrel tube 2 on shaft 3. Housing 4 is rotatably mounted about shaft 3 and has gear 5 fixed thereto. Housing 4 supports rotatable, film dispensing means 6 at a fixed angle with respect to mandrel 2 which angle is adjustable by screw means 7. Thus, a roll of film is mounted on support 6 and rotated about mandrel 2 by housing 4 thereby continuously wrapping film about mandrel 2 as the wrapped film is being removed from the mandrel, to form a hollow, integral continuous helically wound tube 10 of film having a transverse cross section substantially the same as that of mandrel 2. Mandrel 2 has an opening 8 in the downstream end thereof and a preliminary closing means 9 associated with and on either side of opening 8 and adapted to force the center portions of the tube so formed into a contiguous relationship in the opening and along the shorter major axis of the transverse cross section of the mandrel and the minor axis tube formed thereon. Means 9 can simply be a device for forcing and holding the sides together until further forcing and/or bonding operations are reached by the tube or can be a heating device whereby the walls of tube 10 are at least temporarily tacked together in order to maintain their contiguous relationship or the film itself may have an adhesive on at least one surface thereof so that simple pressure from 9 will form the at least temporary tacking of the walls. Tube 10 then passes from mandrel 2 into a final forcing together and bonding device 11.

Device 11 comprises two rolls 12 mounted on either side of tube 10 and adapted to force substantially all of the remaining areas of the two walls of tube 10 into a contiguous relationship similar to that effected by 9 above. Rolls 12 thus flatten the tube to the desired flattened laminate product and by the passing of heating fluid through the rolls by 13 and out of the rolls by 14 bond the two walls so forced together and produce a permanent flattened laminate product. Rolls 12 are driven by gear means 15 which in turn is driven by a gear 16 operatively connected through differential gear box 17 to drive motor 18. Drive motor 18 is also operatively connected through gear box 17 to gear means 19 which meshes with gear 5 to rotate housing 4 about shaft 3. The differential gear box and drive motor are coordinated by means known in the art to maintain the rate of draw-off of tube 10 by rolls 12 relative to the rate at which film roll supported on 6 rotates about mandrel 2. By such a coordination the type of helical tube 10 formed can be varied. That is to say that if the rate of draw-off by rolls 12 is increased for a given rate of revolution of housing 4 and a given film width, a gap between edges 20' of the film 20 can be formed. Similarly, by slowing the speed of withdrawal of rolls 12 and by adjusting the angle subtended by the longitudinal axis of the mandrel and the film roll, any degree of overlap of edges 20' on the mandrel can be effected. Various other variations and combinations of rate of draw for rolls 12, rate of revolving of housing 4, film width and angle of rotation of the film roll will be obvious to one skilled in the art and need not be further elucidated. Edges 20' intersect at an angle theta.

If, for example, the film utilized in the apparatus has a uniaxial orientation parallel to the longitudinal axis of the film itself as indicated by arrow 21 the final product would be a biaxially oriented laminate in that one layer thereof, for example, the top layer as seen in the drawing, would have an orientation in the direction of arrow 22 while the layer contiguous with and below said layer would have an orientation normal to that already mentioned as indicated by dotted arrow 23. Furthermore, the product laminate has its two longitudinal edges 54, 54 integral since they are defined by folds in the film which folds are substantially transverse to the longitudianl axis of the film. Thus, the adhesive zone between the two layers is not exposed but rather is enclosed by the before-mentioned folds.

The edges 24 of mandrel 2 on which the film is wrapped should be provided with means that facilitates removal of tube 10 therefrom. Several alternatives are possible for adapting edge 24 to facilitate such removal.

FIGURE 2 shows preliminary closing means 9 associated with the opening 8 of mandrel 2 as shown in FIGURE 1 and further described in reference to FIGURE 4. Tube 10 on mandrel 2 as it passes over opening 8 is forced together at the center portion of its walls by rotating means 32. Means 32 can either be simply a rotating wheel, ball or other device which is used simply to force the two walls of tube 10 together or it can be a device which is heated, for example by electricity, and which not only forces the walls of tube 10 together but also tacks same at the point of meeting of these walls in order to insure that the contiguous relationship at the center portions is maintained until the remaining portions of the walls are forced together and bonded by rolls 12. The remaining elements shown in FIGURE 2 are specifically described with reference to FIGURE 4.

In FIGURE 3 there is shown a mechanical expedient for facilitating the removal of tube 10 from mandrel 2 in which the upper edge 24 of mandrel 2 is a never-ending belt 25 which is supported in a groove in mandrel 2 by a series of rollers 25 and supporting shafts 26. Thus, when tube 10 is pulled from mandrel 8 in the direction of arrow 27 surface 25 readily moves in that direction and thereby facilitates removal of tube 10.

A cross-sectional view of the apparatus of FIGURE 3 is shown in FIGURE 4 and there is further shown film 20 as it would appear after being wrapped about edge 24 by rotation of the film roll on support 6.

Another alternative for facilitating the removal of tube 10 from mandrel 2 is indicated in general in FIGURE 5 which discloses mandrel 2 as hollow and having an inlet 28 to admit a gas such as air to the interior thereof and to emit that same gas through edge 24. Thus, in lieu of a mechanical expedient there is provided a gas expedient in that tube 10 is supported on a layer of gas instead of directly on edge 24 of mandrel 2.

Figure 6:
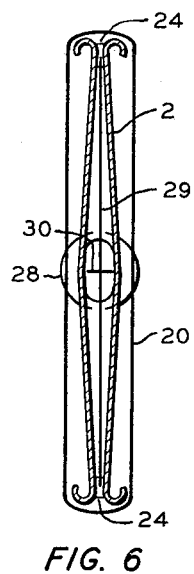
FIGURE 6 is an end view of the mandrel in FIGURE 5.

An end view of mandrel 2 is shown in FIGURE 6 which end view shows the general configuration of the mandrels of this invention and the adaptation of such mandrels to the use of gas to facilitate the removal of tube 10 from mandrel 2 is indicated in general in FIG- 28 and passes out of edges 24 thereby forcing film 20 away from direct contact with edge 24 thereby facilitating the removal of film 20 therefrom.

The configuration of the mandrels of this invention is such that a transverse cross section which would be taken in the same plane as that of FIGURE 6 would show a major axis 29 substantially longer than, preferably at least four times longer than, the shorter major axis 30 of that same cross section.

Figure 7:
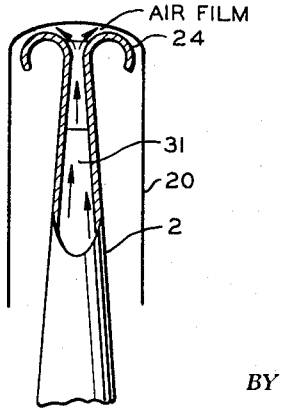
FIGURE 7 is a detailed sectional view of a part of the mandrel of FIGURE 5.

In FIGURE 7 edge 24 is an outwardly curling lip so that gas flowing from the interior 31 of mandrel 2 is directed outwardly over edge 24 against film 20 and then downwardly along the outside of mandrel 2.

Figure 8:
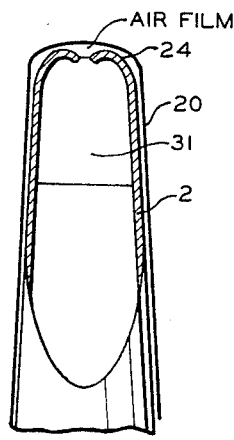
FIGURE 8 is an alternative detailed sectional view of the mandrel of FIGURE 5.

FIGURE 8 shows edge 24 as an inwardly curling lip so that gas passing from interior 31 of mandrel 2 passes out and over edge 24 against film 20 and down the outside surface of mandrel 2.

FIGURE 9 shows apparatus by which a biaxial laminate having two integrally connected longitudinal edges is formed without the use of helical winding of the film about a mandrel. In this embodiment there is provided an endless conveyor-support 40 adapted to rotate about rolls 41 and 42 which are in turn rotated by a suitable means not shown. Film 20, preferably oriented in the direction of arrow 55, is fed to a pair of rollers 43 which are disposed vertically above support 40 and adapted to reciprocate in a direction perpendicular to the longitudinal axis of support 40 as indicated by dotted and solid arrows 44 and 45, solid arrow 45 indicating the direction of movement of rollers 43 in the drawing. Rolls 43 are disposed at an angle to support 40, the end of the roll closest to the end of support 40 from which the laminate is being removed for bonding being the higher end. Thus, film 20 approaches support 40 through rolls 43 at an angle 46 which is less than 90° between the longitudinal axes of the film and the support. Angle 46 is in a direction away from the direction in which the laminate leaves support 40 at roller 42. The rate of reciprocation in the direction of arrows 44 and 45 and the rate of revolution of rolls 49 together with the rate of travel of support 40 should be coordinated in a manner similar to that shown in FIGURE 1 which is also known in the art. The ultimate results of such coordination is that the film is transversely disposed on support 40 relative to its longitudinal axis in a zigzag and flattened configuration, the same sides of the film being contiguous in forming the layers of the laminate. The edges 20' of film 20 intersect at an angle phi. The film is flattened to form two outer longitudinal edges 47, 47 by suitable conventional means, not shown, such as rollers and the like. The two edges 47, 47 are integral and defined by folds in the film which are substantially transverse to the longitudinal axis of the film. The thus cross-laid film travelling on support 40 is passed under means 48 which is adapted to tack the layers of film to one another along their central portion, for example by heating same, in order to rigidify the laminate to a sufficient extent to allow passing of same from support 40 to withdrawal rollers 49. Withdrawal rollers 49 are situated similar to rollers 12 of FIGURE 1 and can perform similar functions such as forcing the laminate closely together, bonding same and withdrawing the laminate from support 40. If rollers 49 are utilized to a significant extent as withdrawal means, their rate of rotation must be coordinated in a conventional manner with the movement of support 40 and rollers 43.

The laminate passes from rollers 49 between belts 56 which rotate about rolls 57, 58, 59 and 60 and contain pressure rollers 61 and radiant heating means 62 disposed between rollers 61. Heating means 62 heat seals the layers of the laminate together while rollers 61 press those layers into intimate contact with one another. Belts 56 maintain the width D, FIGURE 9, of the laminate constant during the heat sealing process. The heat sealed laminate then passes between rollers 63 and on to further dispositions as desired. Rollers 49 and 63 maintain the length of the laminate between them constant during the heat sealing process.

The laminate product emerging from rollers 63 besides having integrally connected longitudinal edges which conceal and protect the zone of adhesion of the two layers is biaxially oriented in that the top layer will have an orientation, for example, as shown by arrow 52 while the bottom layer contiguous with the top layer will have an orientation perpendicular to that indicated by arrow 52 as represented by dotted arrow 53.

It should be noted that here also by adjusting the relative speed of movement of support 40, rollers 43, 49 and 63 and belts 56 the amount of overlap of each layer can be varied from substantially 100 percent overlap, i.e. one layer is laid practically on top of the next preceding layer, or with no overlap, but with layers abutting so there is a thickness equivalent to two layers of film at any point.

Although angle 46 can reasonably vary from a very few to substantially 90°, it is preferred that the angle be chosen for the speeds of movement of support 40, rollers 43, 49 and 63 and belts 56 which will cross-lay film 20 at a speed such that the next preceding layer has about one-half its area covered by its next succeeding layer. This is desirable in that it produces a laminate having no overlap of edges of layers, which overlap produces strips in the laminate more than two layers thick. By maintaining angle 46 so that at the speed of movement of the apparatus above stated about one-half of the area of each layer is covered by the next succeeding layer, the laminate so formed has a uniform cross section throughout. This cross section is two layers in thickness and is substantially free of any overlapping of edges which produces strips having a thickness greater than two layers.

It should be noted that the angle of orientation between the two layers forming the laminate, i.e. the angle between arrows 52 and 53, can vary widely, i.e. from substantially zero to substantially 90°.

FIGURE 10 shows a plan and side view of the laminate product of FIGURE 1 in which the longitudinal edges 54 are integral in that they are formed by folds which are substantially transverse to the longitudinal axis of the film of width B used to form the laminate of width A. The true edges 20' of the film 20 intersect at angle theta and are not transverse to the longitudinal axis of the laminate but rather abut one another thereby providing substantially complete protection of the zone of adhesion 71 of the top and bottom layers 72 and 73 of the laminate.

Similarly, FIGURE 11 shows plan and side views of the product of FIGURE 9 in which the longitudinal edges 47 are integral and the true edges 20' of the film 20 intersect at angle phi and are transverse to the longitudinal axis of the laminate thereby also protecting the zone of adhesion 80 between top layer 81 and bottom layer 82. The film of width C produces a laminate of width D.

FIGURE 12 shows the form that film 20 of width C would assume if it were first processed by the apparatus of FIGURE 9 to form a laminate and then unfolded. Area 90 is the first part of film 20 to be laid down on the moving support (in FIGURE 9, reference numeral 40).

If the support upon which area 90 is laid is moving in the direction of arrow 91 the second area of film 20 to be laid down will be area 92 which area will partially overlap area 90 and partially be in contact with the moving support. Areas 90 and 92 are formed by folding film 20 along line 47 which thereby forms an integral edge for the laminate with reference to reference numeral 47 in FIGURE 9. The third area of film 20 to be laid down is area 93 which will partially overlap area 92 and partially be in contact with the moving support. Similarly, areas 92 and 93 are separated by fold line 47 which also forms an integral edge similar to integral edge 47 of FIGURE 9. The continuous laying and folding of the film in the manner just described can be carried on to any desired extent thereby providing a laminate as described with reference to FIGURE 11 of any desired length.

It should be noted with respect to the helical winding of film about a mandrel as shown in FIGURE 1 that it is within the scope of this invention to employ more than one film roll rotating about a single mandrel and rotating in opposite directions so that the mandrel will be first wrapped with a first film in one direction and then wrapped with a second film in the opposite direction. This provides a 4-layered biaxially oriented laminate.

From the above description relative to FIGURES 1 and 10 of the drawings it can be seen that the relationship between the angle theta, the width A of the film and the width B of the laminate is as follows:

$$2A \tan \tfrac{1}{2}\theta = \frac{B}{\cos \tfrac{1}{2}\theta}$$

Thus, the ratio of A to B equals 2 sin ½θ.

Similarly, for that embodiment of the invention relative to FIGURES 9 and 11, the same relationship holds true and the ratio of the width of the film C to the width of the laminate D is equal to 2 Sin ½φ. Also, relative to FIGURES 9 and 11, the angle 46 at which the film will approach support 40 will be equal to 90° minus ½φ.

Example I

A 4.242-foot width of 3 mil linearly (longitudinally) oriented polyethylene film having a density of 0.96 and a melt index of 0.2 (ASTM D 1238–57 T condition E) and having one side coated with a commercial hot melt adhesive is placed on the film dispenser and a proper dispensing angle relative to the mandrel is set. A flat mandrel with a 6-foot circumference, similar to FIGURE 3, and having a silicon rubber belt, is fixed to a shaft. For an angle θ of 90°, the withdrawal rate of the withdrawal rolls is set to remove 6 feet of laminate for each revolution of the film dispenser about the fixed mandrel. An electrically heated tacking wheel at 220° F. melts a narrow band of the hot melt adhesive and tacks the film layers together before they slip off the mandrel. The film layers are withdrawn from the flat mandrel by steam heated withdrawal rolls at 220° F. thus melting the remaining hot melt adhesive and joining the film layers together over the entire remaining area. The film is allowed to cool slightly to set the adhesive and is then rolled to produce a thin flat laminate having biaxial orientation and its two outer longitudinal edges enclosed by the film from which the laminate is made.

Example II

A roll of 7 mil longitudinally oriented polyethylene film 4.242 feet wide and having a density of 0.945 and a melt index of 5 (ASTM D 1238–57 T condition E) is placed on a pay-off mandrel and adjusted so that the axis of the roll makes an angle of 45° above a conveyor support belt similar to belt 40 of FIGURE 9. The film is fed by means of a pair of nip rollers whose long axes are at the same angle of 45°. The speed of feeding of the film is 73 feet per minute. The nip rollers move back and forth perpendicular to the direction of travel of the conveyor support at a substantially constant speed and complete a back and forth cycle, totaling 6 feet in length, in about 7 seconds. A rotating type tack sealer at approximately 400° F. tack seals the two layers together as they are conveyed along the conveyor support. The tack sealed laminate is then heat sealed over this entire area by passing same through a pair of rollers similar to rollers 49 of FIGURE 9 and then between two radiantly heated polytetrafluoroethylene coated, steel sealing belts which maintain a slight pressure on the laminate under the influence of spring loaded rollers mounted within the belts in a manner similar to roller 61 in FIGURE 9. The steel belts are heated internally by a commercial radiant heating means located between the spring loaded pressure rollers. The heat sealed laminate emerges from between the steel sealing belts and passes through a second set of rollers similar to roller 63 of FIGURE 9. The two sets of rollers and the sealing belts run at a surface speed of about 51.6 feet per minute. The laminate which emerges from between roller 63 has biaxial orientation and two integrally connected longitudinal edges.

Reasonable variations and modifications are possible within the scope of this disclosure without departing from the spirit and scope of the invention.

I claim:
1. A method of making a biaxially oriented plastic film laminate having two integrally connected edges comprising providing a source of uniaxially oriented plastic film, helically winding said film about a mandrel in a configuration to form a hollow, continuous tube of film having a transverse cross section in which the major axis is substantially longer than the minor axis, forcing the central portions of the walls of said major axis into an abutting relationship while supported on said mandrel and bonding said central portions together, thereafter forcing substantially all of the remaining areas of said walls into a similar abutting relationship and bonding said abutting walls one to the other, and subsequently removing a single plastic film laminate having biaxial orientation and two integrally connected edges.

2. The method according to claim 1 wherein a second uniaxially oriented plastic film is helically wound about said tube of film formed by winding the first film about a mandrel, the winding of the second film being in a direction opposite the direction of the first film.

3. A method of making a biaxially oriented plastic film laminate having two integrally connected longitudinal edges comprising providing a source of uniaxially oriented plastic film, helically winding said film about a fixed mandrel of configuration such that there is formed a hollow, integral, continuous tube of film having a transverse cross-section in which the major axis is at least four times longer than the minor axis, forcing the central portions of the walls of said tube which are parallel to said longer major axis into an abutting relationship while supported on said mandrel and bonding said central portions together, thereafter forcing substantially all of the remaining areas of said walls into a similar abutting relationship and bonding said walls one to the other by heating same, and subsequently removing a single plastic film laminate having biaxial orientation and two integrally connected longitudinal edges.

4. Apparatus for making a biaxially oriented plastic film laminate having integrally connected edges comprising a frame, a longitudinally extending mandrel carried by said frame, said mandrel having a transverse cross-section in which one axis is substantially longer than the other axis, said mandrel having an upstream end and a downstream end, said downstream end including an opening extending through said transverse cross-section in the central portion thereof, means carried by said frame adjacent said mandrel and adapted to rotate about same and wrap same helically with a film to form a tubular article having two sides parallel to said longer major axis of said mandrel, means carried by said frame and extending through said opening and adapted to force the central portions of said two sides of said tubular article together along said shorter major axis of said mandrel before removal of said article from said mandrel whereby said central portions may be bonded together, and means carried by said frame downstream of said opening adapted to receive said article from said mandrel, force the remaining portions of said two sides together and bond said sides one to the other.

5. The apparatus according to claim 4 wherein the edges of said mandrel at either end of said longer major axis of said mandrel contain freely rotating means to facilitate removal of said article from said mandrel.

6. The apparatus according to claim 4 where the edges of said mandrel at either end of said major axis of said mandrel contain outlet means for forcing gas between said mandrel and said film on said mandrel.

References Cited

UNITED STATES PATENTS

| | | | |
|---|---|---|---|
| 1,515,792 | 11/1924 | Respess | 161—47 |
| 1,676,351 | 7/1928 | Robinson | 156—194 XR |
| 1,915,626 | 6/1933 | Spohn | 156—194 XR |
| 2,852,840 | 4/1953 | Harvey | 156—194 XR |
| 3,322,613 | 5/1967 | Rasmussen | 161—402 XR |

ROBERT F. BURNETT, *Primary Examiner.*

R. H. CRISS, *Assistant Examiner.*